Patented Sept. 13, 1932

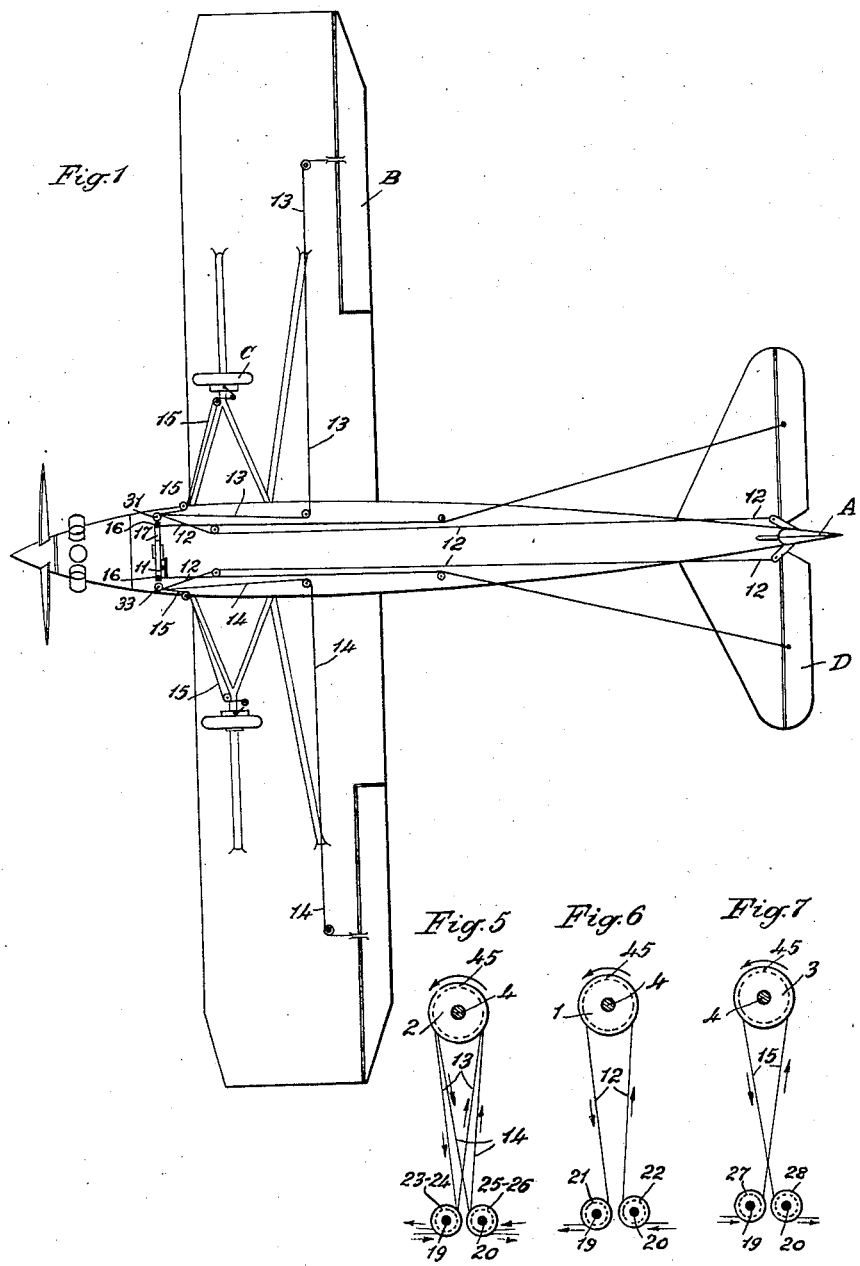

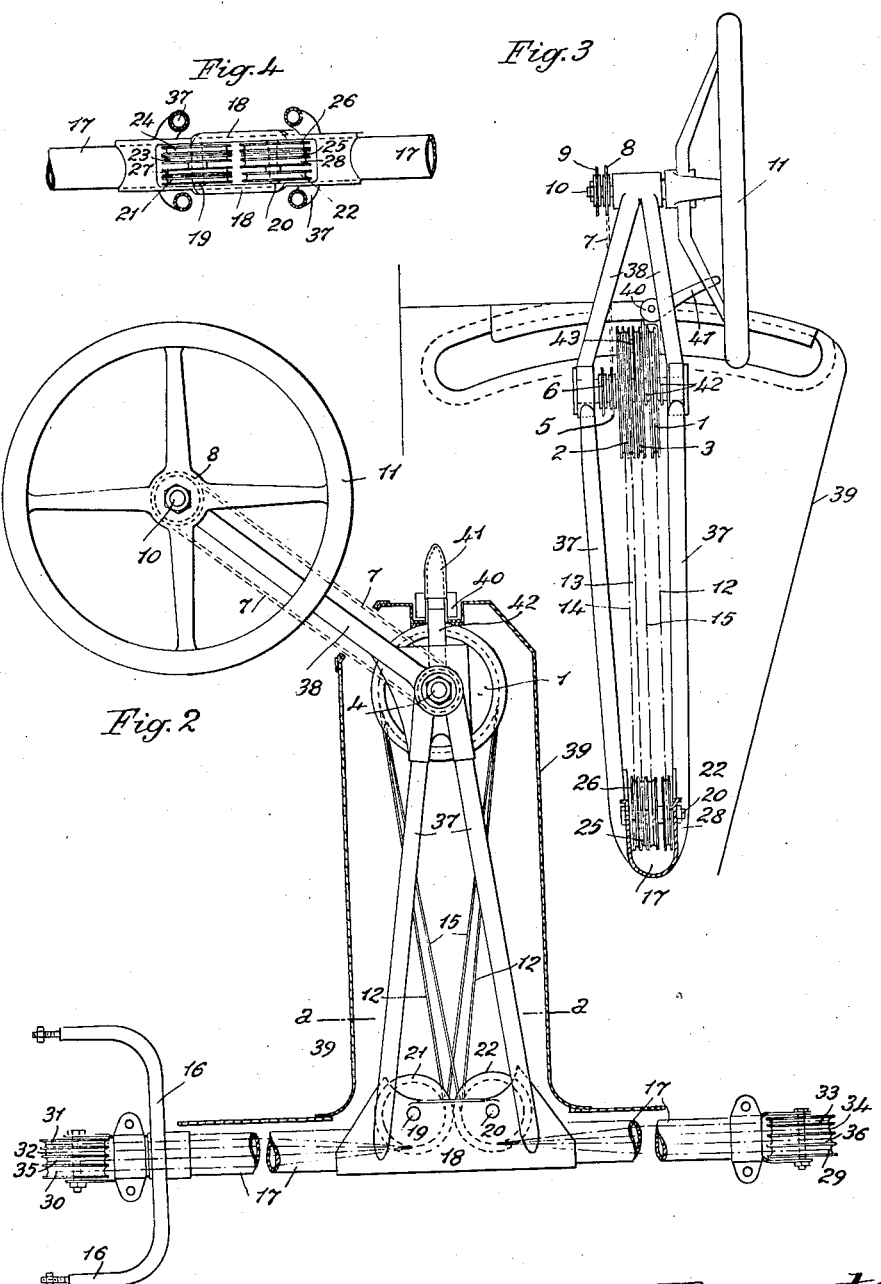

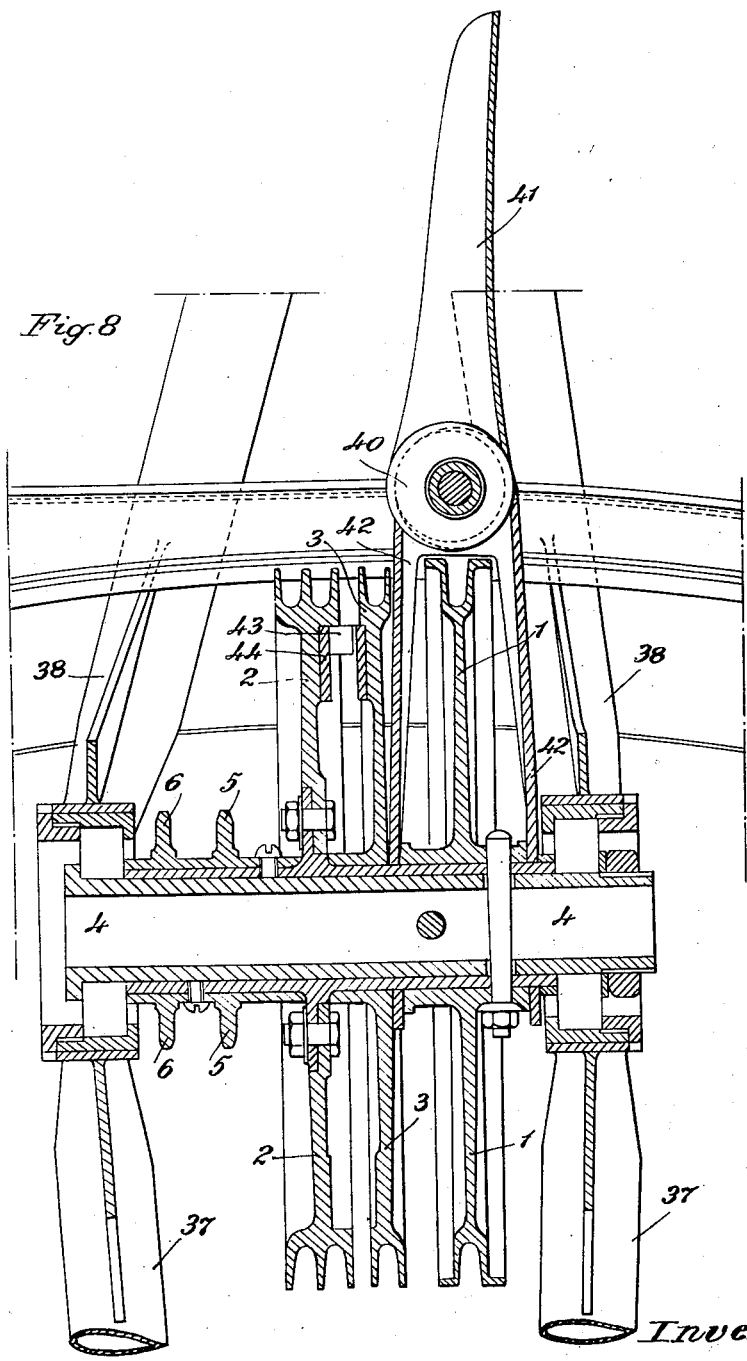

1,877,498

UNITED STATES PATENT OFFICE

MARIO DE BERNARDI, OF ROME, ITALY

COMBINED CONTROLLING DEVICE FOR STEERING AND STABILIZING AIRCRAFT

Application filed November 5, 1930, Serial No. 493,662, and in Italy February 21, 1930.

It is known that for steering an aircraft during the flight controlling means must be at disposal for the horizontal rudder, the vertical rudder and ailerons.

In order to simplify the work of the pilots single controlling organs have been suggested or used capable of three different movements each corresponding to one of the controls above mentioned.

The result has been to diminish the number of controlling organs but the number of movements has not decreased, nor has the inconvenience been prevented that in the case of two controlling operations which should be effected at the same time in concordance and proportionately to each other, one of said operations, owing to error, negligence or inexperience is forgotten, executed in opposite sense or not proportionately to the other operation.

The object of this invention is to remove said inconvenience, the work of the pilot being simplified by reducing the number of movements and combining these movements which must be effected in concordance and proportion (vertical rudder and ailerons) in order that they may take place at the same time in concordance with and proportional to each other; dangers due to oblivion, error or inexperience of the pilot being thus excluded. In order to attain this end the single controlling organ according to the invention is arranged in such a way that one of its movements acts on the vertical rudder and ailerons by moving them at the same time in concordance and proportion to each other.

The work of the pilot is further simplified during the flight by having at his disposal locking means to fix the controlling organs in a determined position when the flight has been settled, while at the moment of landing the single controlling device is coupled to the control of the carriage's brake, this coupling however being loose during normal flight and acting at the moment of landing.

My invention will now be described with reference to the annexed drawings in which Fig. 1 is a diagrammatical plan view of aircraft with my invention applied thereto, Fig. 2 is a front view of the device, Fig. 3 a side view, Fig. 4 a section on line a—a of Fig. 2, Fig. 5 a detail of the grooved pulleys with the aileron operating cables placed thereon, Fig. 6 is a similar view as Fig. 5 showing the grooved pulleys with the steering rudder operating cable placed thereon, Fig. 7 is a view of grooved pulleys with the wheel brake operating cable placed thereon, and Fig. 8 shows an enlarged scale and vertical section the assemblage of the grooved pulleys and locking member of device.

As is seen from these figures, my improved device comprises three grooved pulleys 1, 2, 3 mounted on a common shaft 4. On this shaft are also fixedly mounted toothed wheels 5 and 6 with which engage one or more sprocket chains 7 or other equivalent means connected to other gears 8 and 9 carried in turn with the supporting shaft 10 of the controlling handwheel 11.

Pulleys 1 and 2 are fixed on the shaft 4, whilst pulley 3 is loosely mounted thereon.

Pulley 1 and cable operating thereabout 12 govern the steering rudder A, while the double grooved pulley 2 and cables 13 and 14 trained thereabout control the ailerons B, whilst the pulley 3 and the cable 15 control the known brakes applied to the wheels C of supporting car.

The horizontal rudder D is controlled by cables 16' connected to a bow 16 rigid with the rockably mounted horizontal sectional hollow shaft 17 causing, in the known manner, to oscillate forwards and backwards the entire controlling device assemblage.

The sections of the shaft 17 in front of pulleys 1, 2 and 3 are connected to a channel-like bracket 18 between the sides of which and on the respective axes 19 and 20, are mounted the intermediate pulleys 21 and 22 of the controlling cable 12 of the steering rudder, the pulleys 23, 24, 25 and 26 for the aileron controlling cables 13 and 14, and the pulleys 27 and 28 for the wheel brake operating cable 15. The said ropes or cables pass through the interior of the hollow shaft 17 while in the outer ends of the section of which are journaled the pulleys 29 and 30 for the cable 12, the pulleys 31 and 32, 33 and 34 for the cables 13 and 14 and the pulleys 35 and 36 for the cable 15 respectively.

The cables from the said pulleys are guided by other pulleys suitably disposed on the body of the aircraft and connected to the various parts to be operated (Fig. 1). The said cables are fixed at 45 to their respective pulleys 1, 2 and 3. To the bracket 18 are fixed the standards forming the support frame 37 and 38 of the entire system which is protected by a suitably shaped casing 39 connected to the dash board of the apparatus.

Above and adjacent the pulley 1 there is a cam 40 operated by an arm 41 the whole placed on a support 42. The said cam when rotated by arm 41 acts gradually by friction on the flanges of the grooved pulley 1 so as to lock the whole system for the above described purpose.

The pulley 3 for the operation of the wheel brakes, as above stated, is loose on shaft 4 and provided with a suitable boss 43 adapted to engage an abutment 44 carried with pulley 2 of the ailerons.

The rotation of the latter from right to left, and vice versa, carries the pulley 3 so as to cause to be effected, together with the movement of the ailerons and steering rudder, the necessary ground evolutions of apparatus and therefor its braking for stopping on the field.

The above described structural details are, of course, only given by way of example, as it is understood that according to circumstances the device may assume other shapes within the scope of the invention.

Having now particularly described and ascertained the nature of my said invention and in what manner the same is to be preferred I declare that what I claim is:

1. A combined aircraft steering and stabilizing control device for controlling the horizontal rudder, the vertical rudder and the ailerons, comprising a rockable horizontal shaft, connections between said shaft and horizontal rudder, a support connected to said shaft and movable therewith in a vertical plane, an arm provided on said support, a hand wheel arranged at the free end of said arm, an axle journalled in the top of said support, single grooved and double grooved pulleys carried with the axle, an operable connection between the axle and the hand wheel, operable connections between the single pulley and the vertical rudder and between the double pulley and the ailerons so that upon forward and backward movement of the hand wheel support the horizontal shaft is oscillated and the horizontal rudder thereby controlled while on turning the hand wheel the axle carrying the pulleys is also turned regardless of the position of the support in order to simultaneously control the vertical rudder and the ailerons, the operable connections being such as to effect uniform and proportional displacements thereby reducing the number of controlling movements and preventing errors on the part of a pilot from interfering with the proportional movement of the parts.

2. A controlling device as claimed in claim 1 and in combination therewith control means for the brakes of the carriage of the airplane including another pulley loosely mounted on the axle, an operable connection between said pulley and the brakes, and cooperative means on the brake controlling pulley and the aileron pulley in order that the loose pulley will follow the fixed pulley during rotation of the latter.

3. A combined controlling device as claimed in claim 1, wherein a cam is mounted on the support above and adjacent the steering rudder pulley, an arm for operating the cam in order to effect the gradual friction on the flange of the pulley for locking the entire device.

4. A combined controlling device as set forth in claim 1, wherein the rockable control shaft is hollow and formed in sections, a channel-like bracket connecting the sections together and constituting the lower part of the support, and intermediate pulleys rotatably mounted in the bracket and within the hollow shaft sections for guiding the operable connections to the ailerons and rudder.

In testimony whereof I have hereunto signed my name.

MARIO DE BERNARDI.